United States Patent [19]

Fisher

[11] 3,756,264
[45] Sept. 4, 1973

[54] PRESSURE CONTROL DEVICES FOR FLUID FLOW SYSTEMS

[75] Inventor: Alan Arthur Fisher, Hounslow, England

[73] Assignee: I. V. Pressure Controllers Limited, Middlesex, England

[22] Filed: July 30, 1971

[21] Appl. No.: 167,744

[52] U.S. Cl......... 137/116.3, 137/505.18, 137/627.5
[51] Int. Cl. ........................................... G05d 16/06
[58] Field of Search.................. 137/102, 112, 115, 137/116, 116.3, 116.5, 118, 119, 505.18, 627.5, 625.27

[56] References Cited
UNITED STATES PATENTS

| | | | |
|---|---|---|---|
| 3,204,657 | 9/1965 | Boyd | 137/116.5 |
| 3,357,454 | 12/1967 | Koutnik | 137/627.5 |
| 3,631,878 | 1/1972 | Horst | 137/116.3 |
| 2,663,121 | 12/1953 | Ramsey | 137/116.3 |
| 3,294,455 | 12/1966 | Valentine | 137/116.3 |
| 2,654,975 | 10/1953 | Adams | 137/116.3 |
| 3,485,259 | 12/1969 | Ulbing | 137/116.3 |

Primary Examiner—Martin P. Schwadron
Attorney—Eric H. Waters, John G. Schwartz et al.

[57] ABSTRACT

A pressure reducing and relief valve assembly comprising a pressure balanced valve member movable to control fluid flow from an inlet to an outlet of the assembly, control means responsive to pressure at the outlet side of the assembly to allow or cause the valve member to close at a preselected pressure, and a relief valve operated by said control means so as to normally remain closed but to open when the outlet pressure exceeds said preselected pressure, to allow escape of the excess outlet pressure.

6 Claims, 1 Drawing Figure

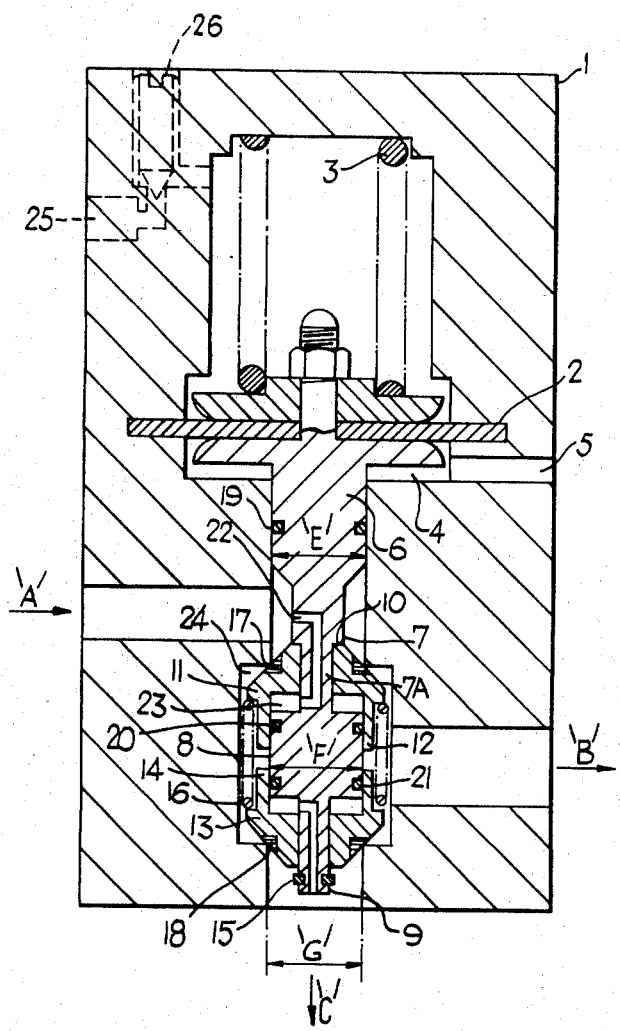

PRESSURE CONTROL DEVICES FOR FLUID FLOW SYSTEMS

BACKGROUND OF THE INVENTION

This invention is concerned with systems and apparatus through which fluid i.e. a liquid or gaseous medium is caused to flow under pressure and has for its chief object to provide a pressure reducing and relief valve for incorporation in such apparatus.

SUMMARY OF THE INVENTION

It is a primary objective of the invention to provide a new and improved pressure reducing and relief valve assembly whereby a constant or substantially constant pressure may be maintained in a fluid flow path at the outlet side of the assembly regardless of inlet pressure variations.

In order to implement this and still further objects of the invention which will become more readily apparent as the description proceeds, there is provided for location in a fluid flow path a valve assembly whereby a constant or substantially constant pressure may be maintained at the outflow side thereof regardless of variations in the inlet pressure, such assembly comprising a pressure balanced valve member adapted to control fluid flow from an inlet to an outlet, control means sensitive to pressure at the outlet side of the valve assembly and operative to allow or cause the valve member to assume a closed position when the outlet pressure reaches a preselected value, and a relief valve, such means also being operative to control said relief valve in such a manner that while the latter will normally remain closed, it will, in the event that the outlet pressure exceeds the aforesaid preselected value, be opened to allow escape of such excess outlet pressure.

BRIEF DESCRIPTION OF THE DRAWING

In order that the said invention may be clearly understood and readily carried into effect reference will now be made to the sole FIGURE of the annexed drawing which shows in section one possible construction of a pressure reducing and relief valve assembly.

DETAILED DESCRIPTION OF THE PREFERRED EMBODIMENTS

Referring to the drawing 1 denotes a valve body which may be made up of a plurality of parts or sections. Disposed within the body is a diaphragm 2 which is loaded by a spring 3 and which will react to fluid or gas pressure in a chamber 4 such pressure being supplied by way of a sensing connection 5 which will be connected to some appropriate part in the fluid flow system in which the valve is installed.

Coupled to the diaphragm 2 is a connection rod member which comprises a portion 6 of a diameter E such that it is a sliding fit in a bore in the body 1, a portion 7 of reduced diameter, a portion 8 of a diameter F equal or substantially equal to the diameter E of the portion 6 and an end portion 9 which is again of reduced diameter.

As drawn the lower part 7a of the portion 7 has its diameter reduced thereby to provide a shoulder 10 which is adapted to serve as a limiting abutment for a first poppet valve or valve member 11 in turn slidably mounted on the part 7a. As drawn the valve member 11 includes an upper conical part and a lower cylindrical skirt portion 12 the internal diameter of which latter is such that it will be a sliding fit on the portion 8 of the connection rod. The drawing shows that valve member 11 lodges or encloses the rod-like connecting member having the portions 6 through 9. Numeral 13 denotes a second poppet valve which constitutes a relief valve and is slidably mounted on the end portion 9 of the connection rod, such valve as drawn comprising a lower portion of inverted conical shape in section and an upstanding skirt portion 14 the internal diameter of which is such that it will be a sliding fit on the portion 8 of the connection rod. As will be seen the portion 9 of the connection rod is provided with a stop 15 the function of which will hereinafter be made apparent.

Interposed between the two poppet valve elements 11 and 13 is a compression spring 16 which serves to urge said valves on to their respective seatings, the valve 11 when seated cutting off the flow of fluid from an inlet A to an outlet B while the valve 13 when seated closes a relief opening C the diameter G of which is equal or substantially equal to the diameters E and F of the portions 6 and 8 of the connection rod.

The poppet valves 11 and 13 are provided with sealing rings 17 and 18 which are formed of an appropriate elastomeric or plastics material and appropriate sealing rings are also provided at 19, 20 and 21. Finally the portion 7 of the connection rod is also provided with a passage 22 which provides communication between the pressure inlet A and a chamber 23 below the valve 11 so that the pressure on said valve will be balanced.

In operation fluid or gas will be supplied to the inlet A. If there is no or insufficient pressure in the chamber 4 the spring 3 will press the diaphragm 2 and hence the connection rod downwardly thereby causing, by virtue of the abutment of the shoulder 10 with the valve 11, the depression of said valve 11 so that the latter will be removed from its seating and allow flow of fluid or gas from A via a chamber 24 to the outlet B.

Should pressure in the sensing connection 5 and hence in the chamber 4 rise sufficiently partially to overcome the force of the spring 3 the connection rod will be caused to rise thereby allowing the spring 16 to return the valve 11 to its closed position with the resultant prevention of further flow of pressure fluid from the inlet A to outlet B.

A further increase in pressure in the chamber 4 will result in further compression of the spring 3 resulting in a further upward movement of the connection rod such as will cause the stop 15 on the portion 9 of the connection rod to lift the relief valve 13 from its seating so that pressure fluid will then flow from outlet B to the relief opening C thereby to relieve pressure in the system at the outlet side of the valve.

To achieve a satisfactory performance the seal 19 must be effective to prevent leakage of pressure between the inlet A and the sensing pressure chamber 4 and further-more the diameters E, F and G should be equal or substantially equal in order that the variable pressure loads within the valve may be balanced. However a very slight reduction in any of such balancing diameters could be used to give a small unbalanced seating load to assist sealing. It will be appreciated that means can readily be incorporated to allow for adjustment of the loading on the diaphragm exerted by the spring 3. Furthermore the diaphragm may conceivably be replaced by a piston the loading of which may be effected by a spring or any other appropriate means.

In a modified embodiment the spring 3 may be dispensed with and the requisite loading of the diaphragm 2 may be effected by creating a predetermined pressure in the closed space or chamber above said diaphragm. For such a purpose a charging aperture or passage may be provided in the valve body as indicated in dotted lines in the drawing at 25 such aperture or passage being controlled by a threaded needle valve member 26. With such an arrangement the space or chamber above the diaphragm would be charged with gas at a pressure substantially equal to the desired outlet pressure of the valve and such charge, which would be effectively locked in by appropriate tightening of the valve member 26, would constitute a gas spring operative to control the valve operation in a similar manner to the spring 3 in the embodiment previously described.

With a reducing plus relief valve such as is above described and illustrated it will be possible to reduce to a constant outlet pressure a variable pressure inlet flow and safety will be provided by the relief venting arrangement which becomes effective in the event of any over pressurisation in the outlet line. A contruction such as is above described will allow for the provision of a relatively large relief area which will result in an important safety improvement over other known methods of pressure reduction.

By inserting a valve of the kind above described in advance of a conventional pressure reducing valve it may be used in a "Flow Limiting" sense in as much as failure of the conventional valve would be protected by the relief feature of the valve of the invention. When used in this way the sensing connection 5 will be connected to the pressure occurring from the outlet port of the conventional pressure reducing valve. When used as pressure control valve the connection will directly sense the pressure in the chamber 24 or at the outlet B.

While there are shown and described preferred embodiments of the invention, it is to be distinctly understood that the invention is not limited thereto but may be otherwise variously embodied and practised within the scope of the following claims.

What is claimed is:

1. A reducing and relief valve assembly for maintaining a substantially constant pressure in a fluid flow system, comprising: a valve member for controlling fluid flow from an inlet to an outlet; control means sensitive to fluid pressure at the outlet side of the valve assembly and operative to cause said valve member to assume a closed position when said pressure reaches a preselected value; and a relief valve; said control means also being operative to control said relief valve in such a manner that while the latter normally remains closed it will, in the event that said pressure exceeds said preselected value, be opened to allow escape, through an outlet separate from said control means, of the excess outlet pressure; said valve member enclosing a rod-like member slidable axially in a bore in a body portion of said valve member; the latter and said relief valve forming part of respective poppet valve elements slidably mounted on said rod-like member; the first poppet valve element having a valve face cooperating with a valve seating located in said bore and defining a passage providing communication between said fluid inlet and said outlet, while the second poppet valve element has a valve face directed away from and in the opposite direction to said valve face of the first poppet valve element, and normally closes said outlet, providing for escape of said excess outlet pressure; wherein said rod-like member further includes four axially succeeding portions, the first and third of which are of substantially equal diameter whilst the second and fourth are of reduced diameter; and wherein said poppet valve elements are assocated one with each of said second and said fourth portions of the rod-like member; the arrangement being such that axial displacement of said rod-like member in one direction results in said first poppet valve element being displaced from said valve seating, thereby to allow fluid flow from said inlet to said outlet, while reverse movement of said rod-like member allows a return movement of said first poppet valve element towards said valve seating; such reverse movement being continued in the event of the presence of said excess outlet pressure, thereby to cause said second poppet valve element to be moved from its closed position to allow the escape of said excess outlet pressure.

2. The valve assembly as defined in claim 1, wherein said poppet valve elements are mounted so as to be capable of limited sliding movement on their respective portions of said rod-like member and are normally urged into engagement with their respective valve seatings by resilient means interposed therebetween.

3. The valve assembly as defined in claim 1, further comprising passages provided in said rod-like member to allow balancing of pressures on said poppet valve elements.

4. The valve assembly as defined in claim 1, wherein said control means include a diaphragm coupled to said rod-like member, forming one boundary of a chamber subject to said outlet fluid pressure, and being loaded to a predetermined value, so that the operation of the valve assembly is effectively controlled.

5. The valve assembly as defined in claim 4, further comprising a spring for the loading on said diaphragm.

6. The valve assembly as defined in claim 4, wherein the loading on said diaphragm is effected by controlled gas pressure.

* * * * *